J. W. A. ELLING.
SPRING FOR VEHICLES, ESPECIALLY AUTOCARS.
APPLICATION FILED JAN. 6, 1914.
1,130,157.
Patented Mar. 2, 1915.
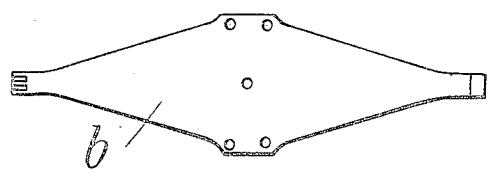
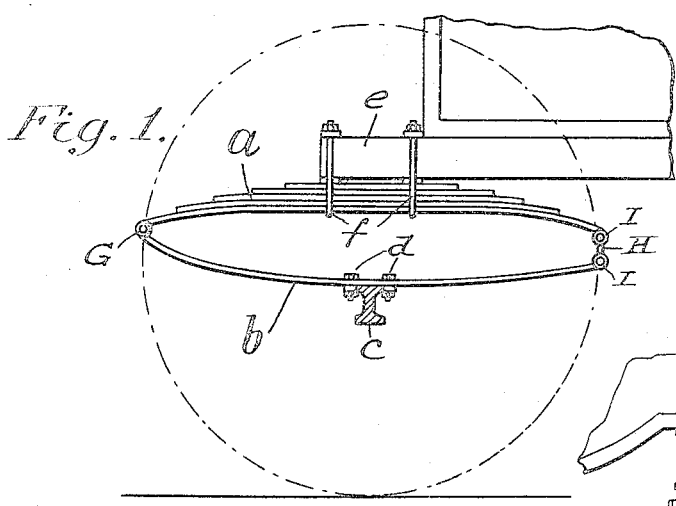
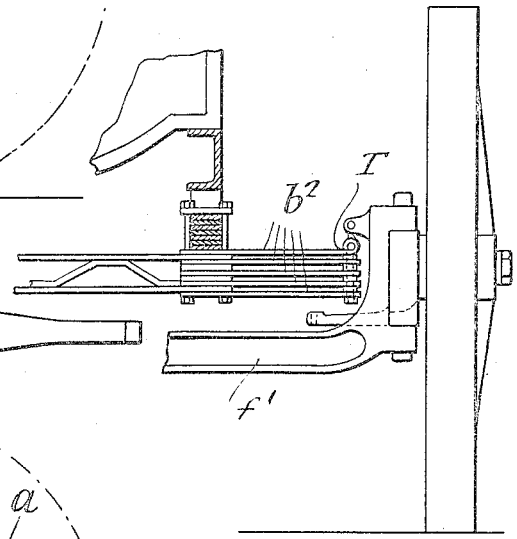
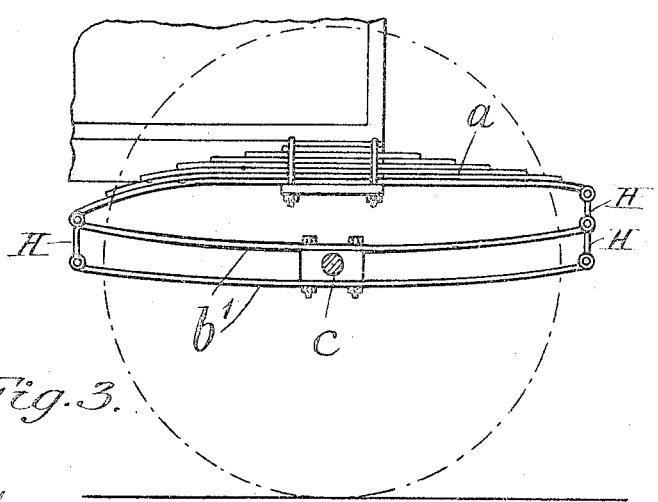
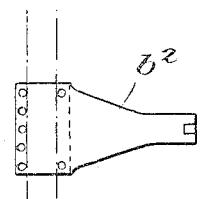

UNITED STATES PATENT OFFICE.

JENS WILLIAM AEGIDIUS ELLING, OF CHRISTIANIA, NORWAY.

SPRING FOR VEHICLES, ESPECIALLY AUTOCARS.

1,130,157.   Specification of Letters Patent.   Patented Mar. 2, 1915.

Application filed January 6, 1914. Serial No. 810,608.

*To all whom it may concern:*

Be it known that I, JENS WILLIAM AEGIDIUS ELLING, a subject of the King of Norway, residing at Christiania, Norway, have invented certain new and useful Improvements in Springs for Vehicles, Especially Autocars, of which the following is a specification.

Heretofore it has been impractical to equip fast driven vehicles, such as automobiles with solid rubber tires, as the axles, bearings and coöperating parts of the chassis of the automobile could not withstand the excessive vibrations resulting from the combination of rough roads and fast driving.

Heretofore the springs of an automobile were of the internal friction type, composed of several layers of superimposed band of flat springs, each successive upper band being shorter than the next lowermost band, and the whole assembled structure having approximately the strength of a single band spring of equal thickness. When the spring is deflected each leaf rubs against the adjacent leaves, thereby causing a greater frictional resistance, than if a single thicker band spring were used. Consequently the frictional resistance must first be overcome, which retards the oscillation of the spring and its complemental body, subjecting the body and axle to sudden jars, obviously the return of the spring and body to its normal position is correspondingly retarded. The action of the spring is retarded an amount equal to the frictional resistance of the individual leaf or band springs.

On vehicles equipped with internal friction springs the wheels when the same strike an obstruction or rut on the road, leave the road since the wheels and axle cannot be released quickly enough, due to the frictional resistance of the individual leaf springs, consequently the axle and its complemental parts being subject to severe vibrations have a shorter life.

The principal object of the invention is the provision of an internal friction non resilient spring, and a resilient band spring secured to the axle of the vehicle.

With this and other objects in view the invention consists of the improvements hereinafter described and finally claimed.

The nature, characteristic features and scope of the invention will be more fully understood from the following description taken in connection with the accompanying drawings forming part thereof and in which:

Figure 1 is a side view of the front spring construction. Fig. 2 is a plan view of the resilient spring. Fig. 3 is a side view of the rear spring construction. Fig. 4 is a plan view of the resilient spring shown in Fig. 3. Fig. 5 is a front view of the resilient spring showing the frame in section. Fig. 6 is a plan view of the resilient spring shown in Fig. 5.

Referring to the drawings and particularly to Figs. 1 and 2, I have there shown a preferred embodiment of my invention in which $c$ denotes the front axle of a vehicle provided with an elastic leaf spring member $b$, by means of bolts $d$. An internal friction spring $a$, is secured to the frame $e$, by means of a pair of bands $f$—$f$ which encircle the frame and spring and serve to retain the same in adjusted position. A bolt $g$ serves to pivot the front ends of the springs $a$—$b$ together, while a double link H is pivoted to each of the springs by means of bolts I. This construction allows the spring $b$ to be compressed without bending the spring $a$.

Referring to Figs. 3 and 4, I have there shown the construction of the rear springs which due to the narrow space available has a smaller cross sectional area and I have therefore found it advisable to superimpose two resilient bands $b'$ one on each side of the axle $c$ and having their ends connected by means of the double links H.

Referring to Fig. 5, I have there shown a series of superimposed transversal elastic band springs $b^2$ secured in spaced relation as at T to the vertical portion of the axle $f'$.

The operation of the device is as follows: When the wheel of the vehicle strikes an obstruction or rut the spring $b$ is deflected and due to the link H can be compressed without affecting the spring $a$. Should the shock be extremely severe, the spring $b$ would be compressed until the link H is substantially a continuation of the spring $a$, when the spring $a$ would be placed under tension.

I have herein described my invention as best known to me at the present time for practising the same, but I do not limit myself to the exact design shown as I may deviate from the same without departing from the spirit of my invention or the scope of the appended claims.

I claim:—

1. A spring device positioned intermediate a frame and axle, said device consists of two main members, one of said members secured to said body, the other of said members secured to said axle, said first mentioned member formed of a series of internal friction bands, said last mentioned member formed of at least one elastic band secured in spaced relation, the ends of said members being pivoted together, substantially as described.

2. A spring device for vehicles comprising two main springs, a frame and axle, said device positioned intermediate said frame and axle, one of said springs secured to said frame, the other of said springs secured to said axle, said main springs having their ends connected, said main spring connected to said axle consisting of at least one flat spring secured in spaced relation, substantially as described.

In testimony whereof I affix my signature in presence of two witnesses.

JENS WILLIAM AEGIDIUS ELLING.

Witnesses:
　M. E. SULLOVENSEN,
　RUTH LINDSTROM.